(12) United States Patent
Yokawa

(10) Patent No.: US 8,208,078 B2
(45) Date of Patent: Jun. 26, 2012

(54) PANEL TYPE TV AND DISPLAY PANEL FITTING STRUCTURE

(75) Inventor: Akira Yokawa, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1216 days.

(21) Appl. No.: 12/005,209

(22) Filed: Dec. 26, 2007

(65) Prior Publication Data

US 2008/0158445 A1  Jul. 3, 2008

(30) Foreign Application Priority Data

Dec. 28, 2006  (JP) ................................. 2006-355788

(51) Int. Cl.
  *H04N 5/64* (2006.01)
(52) U.S. Cl. ......................................... 348/836; 348/839
(58) Field of Classification Search .......... 348/836–843; 312/7.2
  See application file for complete search history.

(56) References Cited

U.S. PATENT DOCUMENTS

| | | | | |
|---|---|---|---|---|
| 4,017,129 A * | 4/1977 | Boldt et al. | ...................... | 312/7.2 |
| 4,710,591 A * | 12/1987 | Rochester, Jr. | ................ | 174/372 |
| 4,853,790 A * | 8/1989 | Dickie | ............................ | 348/819 |
| 5,359,421 A * | 10/1994 | Maeda | ........................... | 348/818 |
| 5,363,150 A * | 11/1994 | Kojima | ........................... | 348/836 |
| 5,742,360 A * | 4/1998 | Kwon et al. | ..................... | 348/839 |
| 6,124,901 A * | 9/2000 | Diven et al. | .................... | 348/822 |
| 6,795,131 B1 * | 9/2004 | Jung | ............................... | 348/836 |
| 7,440,038 B2 * | 10/2008 | Kato | ............................... | 348/794 |
| 7,515,222 B2 * | 4/2009 | Yamanaka | ....................... | 349/58 |
| 7,652,724 B2 * | 1/2010 | Fukano | ........................... | 348/836 |
| 7,946,713 B2 * | 5/2011 | Kishi et al. | ...................... | 353/57 |
| 2005/0212982 A1 * | 9/2005 | Soga | ............................... | 348/825 |
| 2006/0077629 A1 * | 4/2006 | Shiraishi | ........................ | 361/681 |

FOREIGN PATENT DOCUMENTS

| | | |
|---|---|---|
| FR | 2884998 A | 10/2006 |
| JP | 07-016468 U | 3/1995 |
| JP | 3072614 U | 8/2000 |

(Continued)

OTHER PUBLICATIONS

The extended European search report, pursuant to Rule 62 EPC dated Aug. 25, 2008, searched on Aug. 14, 2008.
Japanese Notice of the reason for refusal dated Jun. 2, 2011.

*Primary Examiner* — Robert Canfield
*Assistant Examiner* — Charissa Ahmad
(74) *Attorney, Agent, or Firm* — Yokoi & Co., U.S.A., Inc.; Toshiyuki Yokoi

(57) ABSTRACT

On the periphery of the opening, there are formed the rib extending toward the position corresponding to the region of the video non-display region Y of the liquid-crystal panel, not covered by the metal sheet, and the rib in such a shape as to be offset on the outer side of the rib, extending toward the metal sheet, and the rib, and the rib each are at an equal distance from the display face of the liquid-crystal panel, each being in the shape gradually approaching toward the rear face from the respective corners of the opening toward the region in the vicinity of the centers of the respective sides thereof. Consequently, it is possible to form a gap of such a predetermined spacing as not to make a viewer discomfort while keeping the display panel out of contact with a view area periphery of the cabinet.

6 Claims, 11 Drawing Sheets

FOREIGN PATENT DOCUMENTS

| | | |
|---|---|---|
| JP | 3073214 U | 8/2000 |
| JP | 3073214 U | 8/2000 |
| JP | 2004-208046 A | 7/2004 |
| JP | 3110997 U | 5/2005 |
| JP | 3115175 U | 9/2005 |
| JP | 2005-333290 A | 12/2005 |
| WO | 2006/090543 A | 8/2006 |

\* cited by examiner

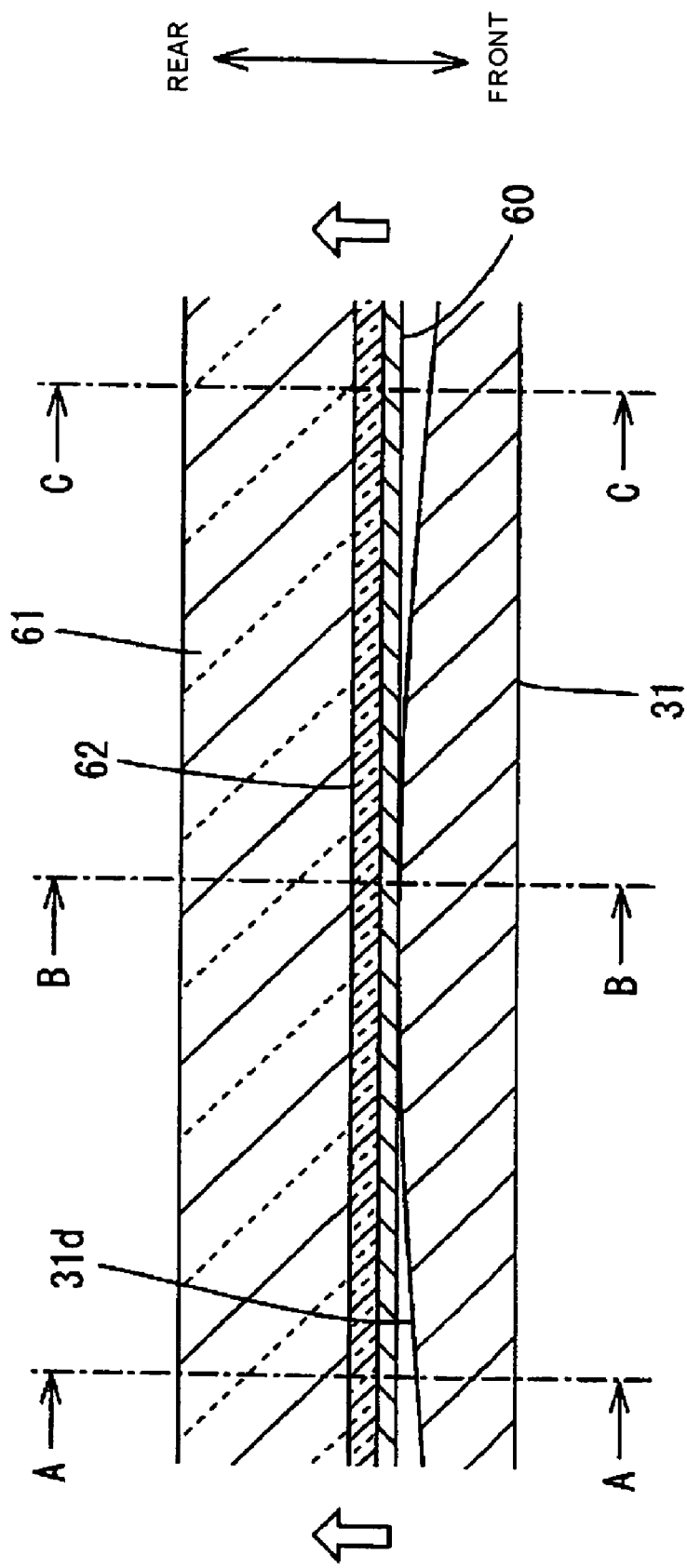

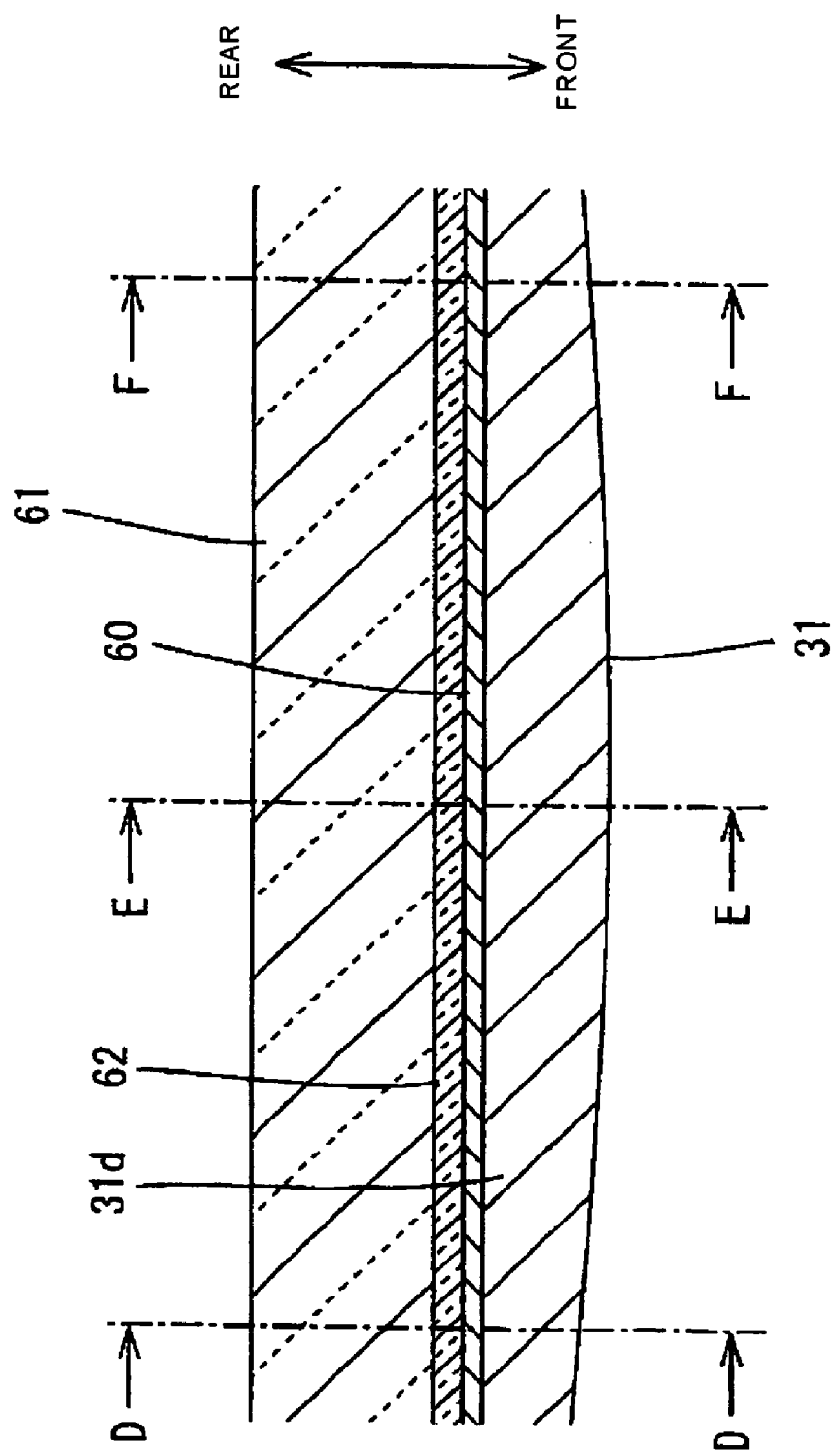

D-D

E-E

F-F

PANEL TYPE TV AND DISPLAY PANEL FITTING STRUCTURE

CROSS-REFERENCES TO RELATED APPLICATIONS

The present application is related to the Japanese Patent Application No. 2006-355788, filed Dec. 28, 2006, the entire disclosure of which is expressly incorporated by reference herein.

BACKGROUND OF THE INVENTION (1) Field of the Invention

The present invention relates to a panel type TV, and a display panel fitting structure.

(2) Description of Related Art

In order to fit a display panel of a panel type TV to a front cabinet thereof, fixture bosses have been installed at positions offset from a panel tube face, on the front cabinet side of the panel type TV, in the past, thereby having secured the display panel to the bosses installed at about 10 spots (upper side: 3, lower side: 3, and right and left sides: 2 each), respectively, on the circumference of the front cabin by screws, respectively. The bosses used to be disposed at intervals of such a distance as not to permit floating to occur between the front cabinet, and the display panel at positions between the respective bosses when the display panel is secured.

Further, in order to absorb warp of the front cabinet, and variation in the extent to which the front cabinet is drawn, caused by the screws, an unwoven cloth has been added to the circumference of the front cabinet. By so doing, it has become possible to execute assembling with a gap between the panel tube face, and the front cabinet being kept uniform, however, there has remained room for improvement in terms of parts count, work efficiency, and the number of work process steps.

Now, with reference to a structure for fitting an image-receiving unit to a cabinet, such technologies as disclosed in Japanese Utility Model Registration No. 3073214, No. 3072614, No. 3110997 and Japanese Unexamined Utility Model Application Publication No. Hei 7 (1995)-16468. These Documents, respectively, are well known. For example, in Patent Documents Japanese Utility Model Registration No. 3073214 and No. 3072614, respectively, it is described that when the image-receiving unit is secured to the periphery of an opening of a front cabinet, the latter is caused to be in intimate contact with an image-receiving face of the image-receiving unit, in Japanese Utility Model Registration No. 3110997, there is described a panel display television wherein a cabinet thereof has a structure for positioning a display panel, and in Japanese Unexamined Utility Model Application Publication No. Hei 7 (1995)-16468, it is described that fingers formed on a panel are engaged with holes formed in a cabinet, respectively, thereby fitting the panel to the cabinet.

Any of the technologies disclosed in the Documents, respectively, however, is intended to cause the image-receiving unit to be in intimate contact with the cabinet, but is not intended to keep the display panel out of contact with a view area periphery of the cabinet, thereby forming a gap therebetween, kept at a predetermined spacing.

BRIEF SUMMARY OF THE INVENTION

The present invention discloses a panel type television comprising:

a display panel formed in a rectangular shape; a metal sheet covering an edge of a front face of the display panel; a front cabinet facing the front face of the display panel with a predetermined clearance to the front face of the display panel; a rectangular opening formed in the front cabinet exposing a video display region on the front face of the display panel; one or more screw securing structures formed on at least a portion adjusting to a corner of the opening for coupling the display panel with the front cabinet; a first rib protruding from a first position of the front cabinet where is along all sides of the opening to the display panel, whose height is risen by leaving from the corner of the opening; a second rib protruding from a second position of the front cabinet where is outer than the first position to the metal sheet covering an edge of the front face of the display panel, whose height is same as the height of the first rib; a tuner for receiving a signal at a desired frequency out of a TV broadcast signal inputted via an antenna and outputting an intermediate frequency signal; a video signal processor for extracting a video signal out of the intermediate frequency signal outputted by the tuner, and generating a panel drive signal corresponding to the video signal; and a driver for driving the display panel on the basis of the panel drive signal in order to display a video on the video display region.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

FIG. 8 is an exemplary sectional view showing a rib 31d and the liquid-crystal panel before secured together by the screws.

FIG. 10 is an exemplary sectional view showing the rib 31d and the liquid-crystal panel after secured together by the screws.

DETAILED DESCRIPTION OF THE INVENTION

The detailed description set forth below in connection with the appended drawings is intended as a description of presently preferred embodiments of the invention and is not intended to represent the only forms in which the present invention may be constructed and/or utilized.

An embodiment of a liquid-crystal TV according to the invention is described hereinafter in accordance with the following order.

A. An electrical configuration of the liquid-crystal TV
B. A structure of the liquid-crystal TV
C. A positional relationship between a liquid-crystal panel and ribs
E. Summary A. The Electrical Configuration of the Liquid-Crystal TV The embodiment of the invention is described hereinafter with reference to FIGS. 1 to 11. With the present embodiment, there is described the case of the liquid-crystal TV adopting the liquid-crystal panel as a display panel, however, needless to say, the invention may be applied to a plasma TV adopting a plasma display panel (PDP). Further, it goes without saying that the invention will be applicable to any display panel that can be developed in the future.

Figure 1:
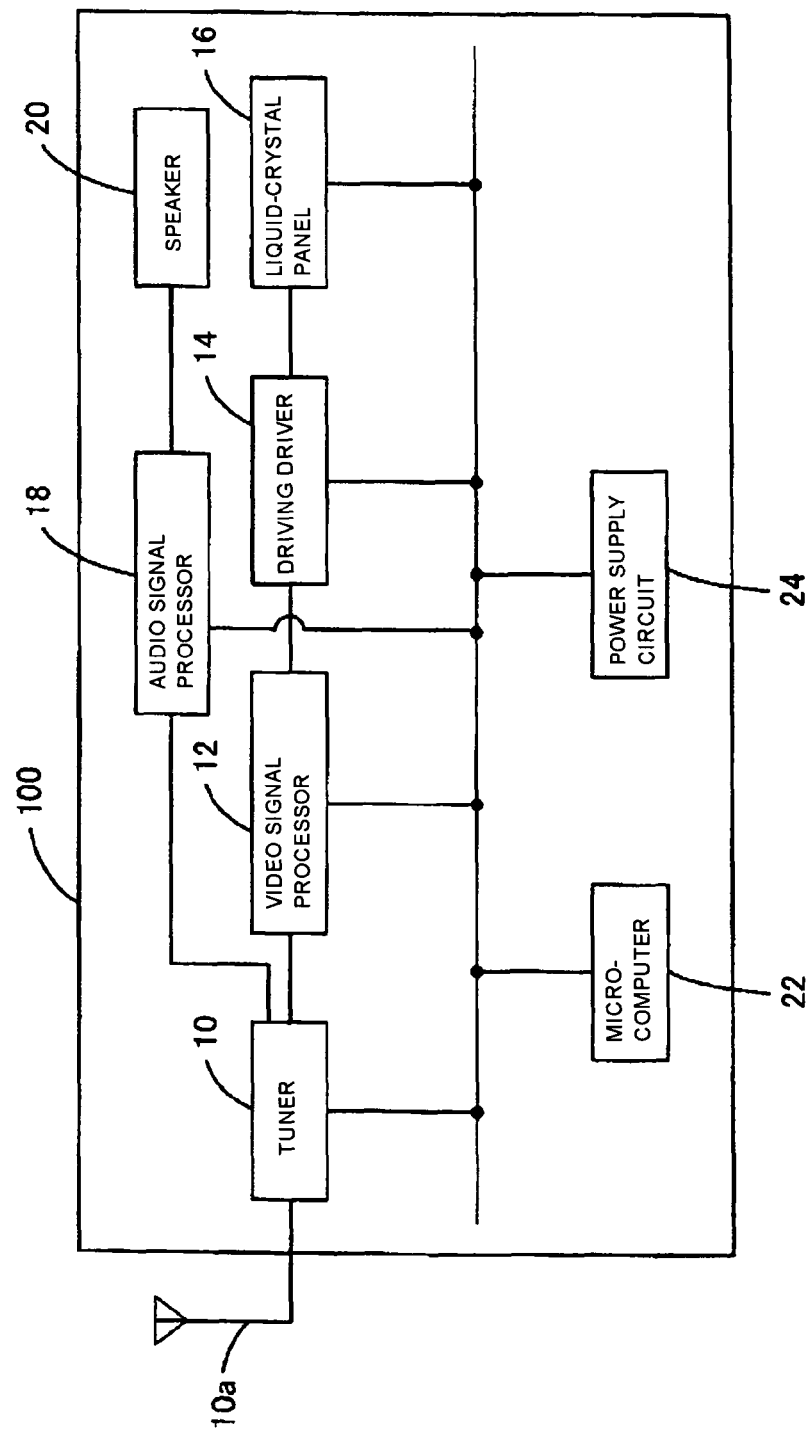
FIG. 1 is an exemplary block diagram showing an electrical configuration of a liquid-crystal.

FIG. 1 is a block diagram showing the electrical configuration of a liquid-crystal TV 100 according to the present embodiment. In FIG. 1, the liquid-crystal TV 100 comprises a tuner 10, a video signal processor 12, a driving driver 14, a liquid-crystal panel 16, an audio signal processor 18, a speaker 20 and a microcomputer 22. The tuner 10, the video signal processor 12, the driving driver 14, the liquid-crystal panel 16, the audio signal processor 18, the microcomputer 22, and a power supply circuit 24 are connected to each other through the intermediary of an IIC bus, which is a serial communications bus, and are capable of communicating with each other.

With the tuner 10 according to the present embodiment, there is adopted a station-select mechanism of the so-called PLL scheme, and a receive frequency is controlled by directly controlling a local oscillation frequency on the basis of predetermined frequency data inputted from the microcomputer 22, thereby enabling a signal at a desired frequency to be received. More specifically, a TV broadcast signal is inputted via an antenna 10a whereupon the tuner 10 receives the TV broadcast signal while tuning to the signal at the desired frequency on the basis of a station-select signal outputted by the microcomputer 22, and extracts a necessary signal out of the signal received, converting the necessary signal into an intermediate frequency signal through high frequency amplification before outputting the intermediate frequency signal.

The video signal processor 12 extracts a video signal out of the intermediate frequency signal outputted by the tuner 10, and applies a scaling processing, and various picture quality adjustment processing to the video signal as extracted, subsequently generating a panel drive signal corresponding to the video signal to be then outputted to the driving driver 14. The driving driver 14 drives the liquid-crystal panel 16 on the basis of the panel drive signal as inputted, thereby displaying a video on a screen. The audio signal processor 18 extracts an audio signal out of the intermediate frequency signal outputted by the tuner 10, and applies a predetermined signal processing, and amplification to the audio signal as extracted to be then outputted to the speaker 20.

The microcomputer 22 is provided with a program execution environment comprising a CPU, a ROM, and a RAM, incorporated therein, and executes operation of various programs stored in the ROM with the use of the CPU while using the RAM as a work area, thereby controlling the liquid-crystal TV 100 as a whole.

A power supply voltage is fed from the power supply circuit 24 to each of those components (the tuner, the video signal processor, the audio signal processor, the driving driver, the liquid-crystal panel, and the microcomputer) making up the liquid-crystal TV 100.

B. The Structure of the Liquid-Crystal TV

Figure 2:
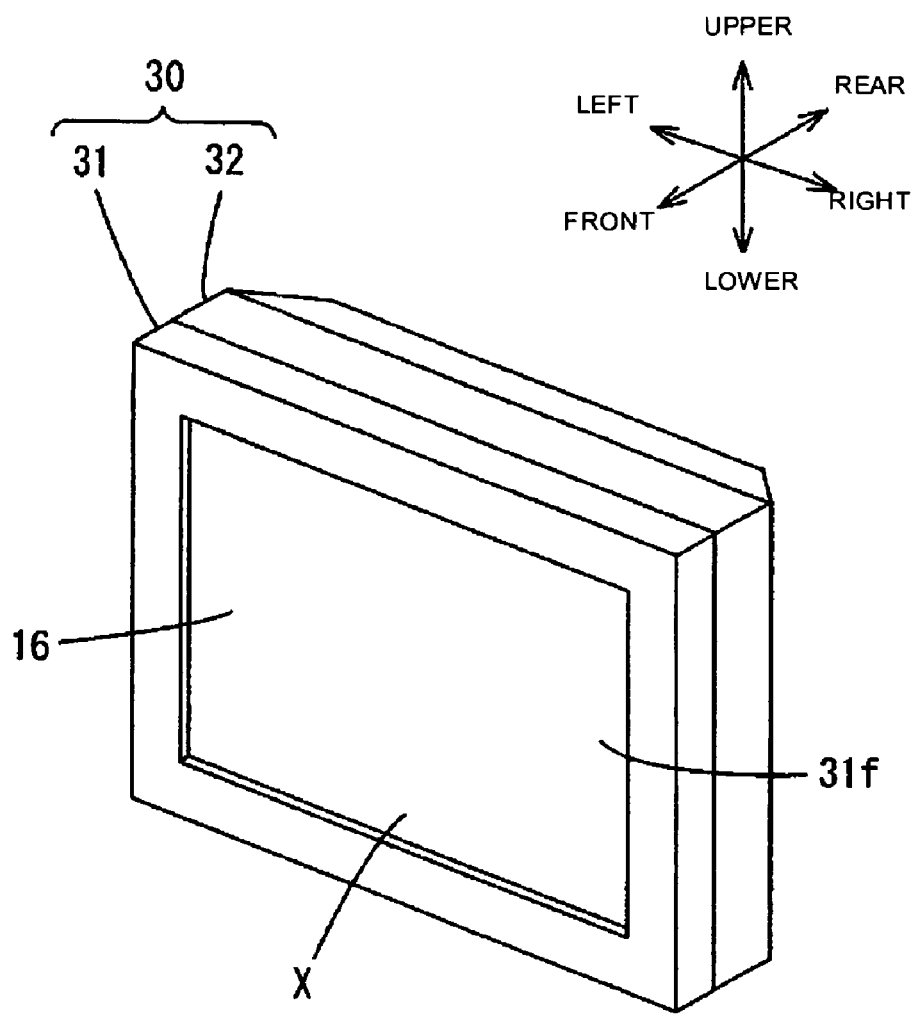
FIG. 2 is an exemplary perspective view showing the liquid-crystal TV as seen on the skew.
Figure 3:
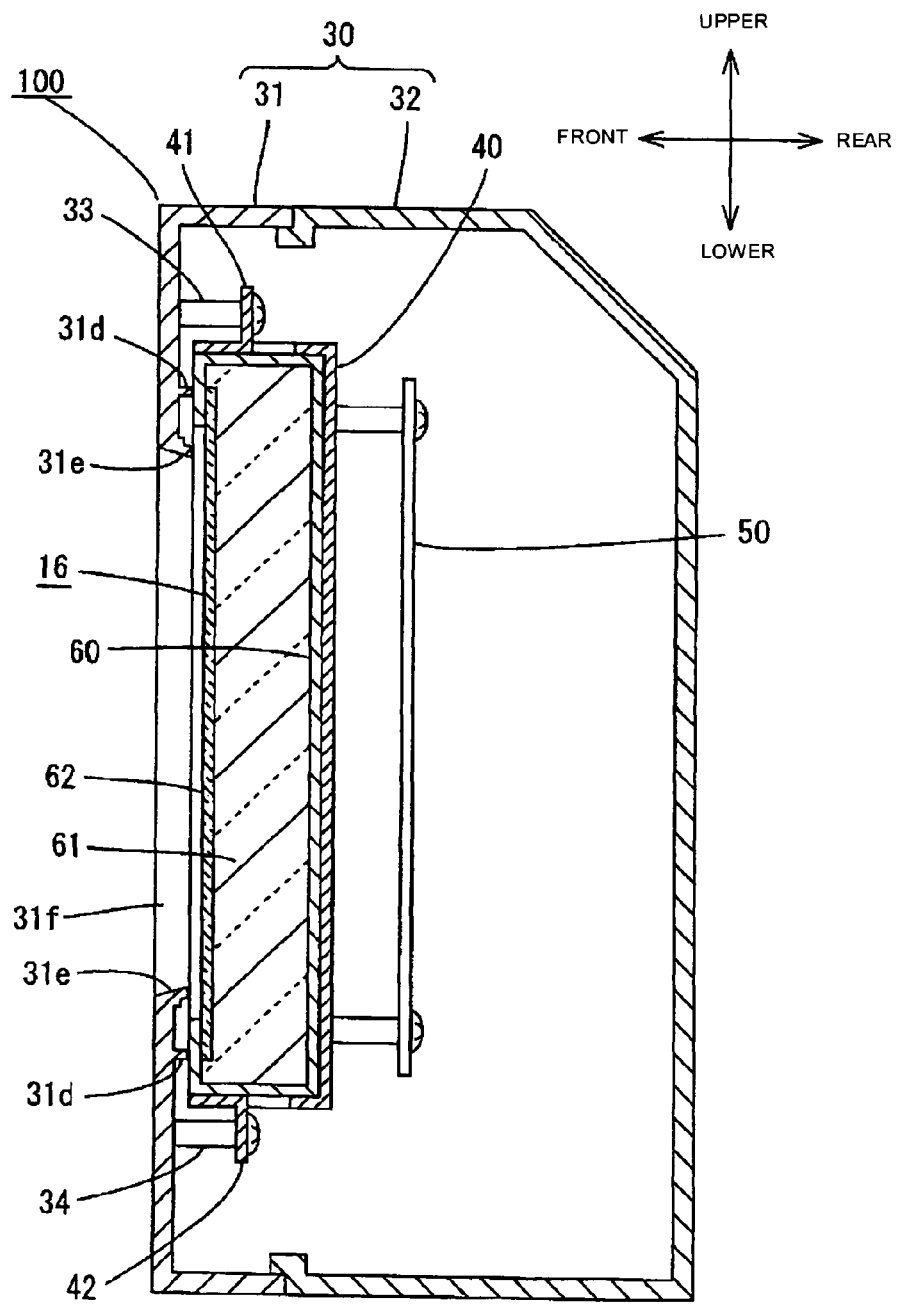
FIG. 3 is an exemplary sectional view of the liquid-crystal TV shown in FIG. 2.
Figure 4:
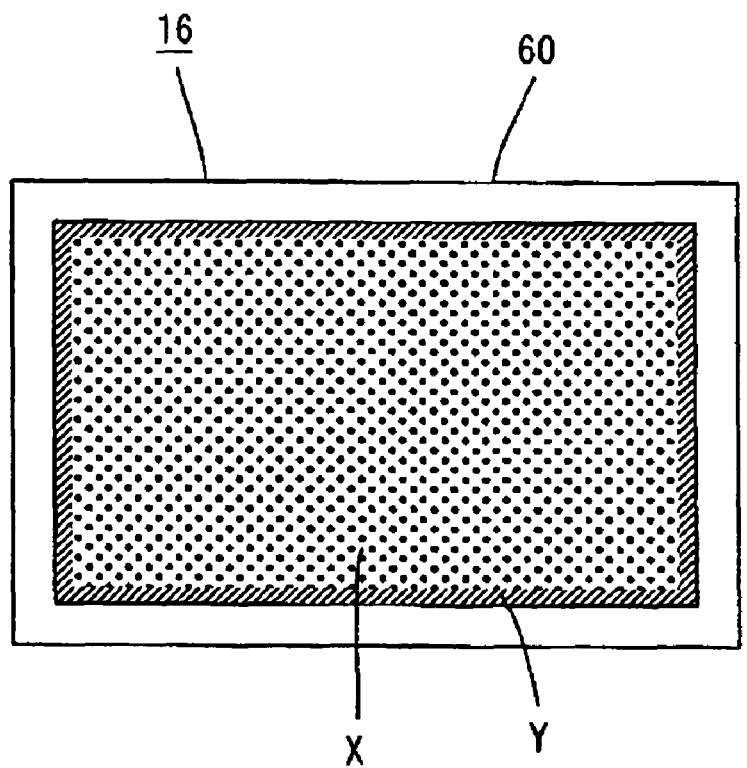
FIG. 4 is an exemplary schematic representation showing a positional relationship among a video display region, a video non-display region, and a metal sheet.
Figure 5:
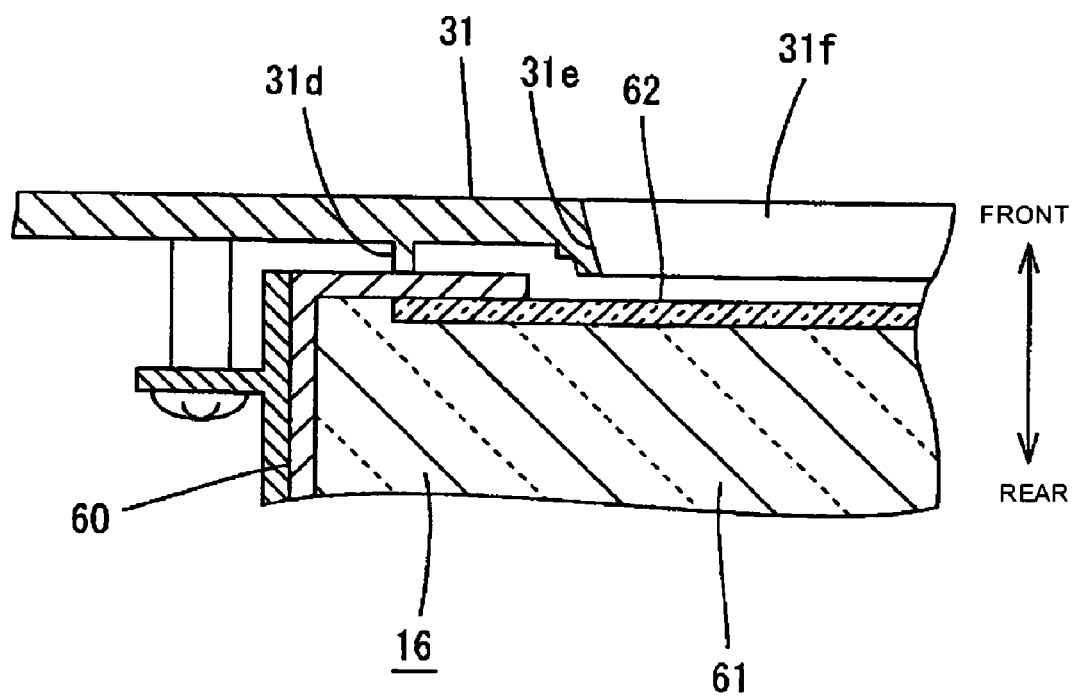
FIG. 5 is an exemplary schematic representation illustrating spacing between the liquid-crystal panel, and ribs.
Figure 6:
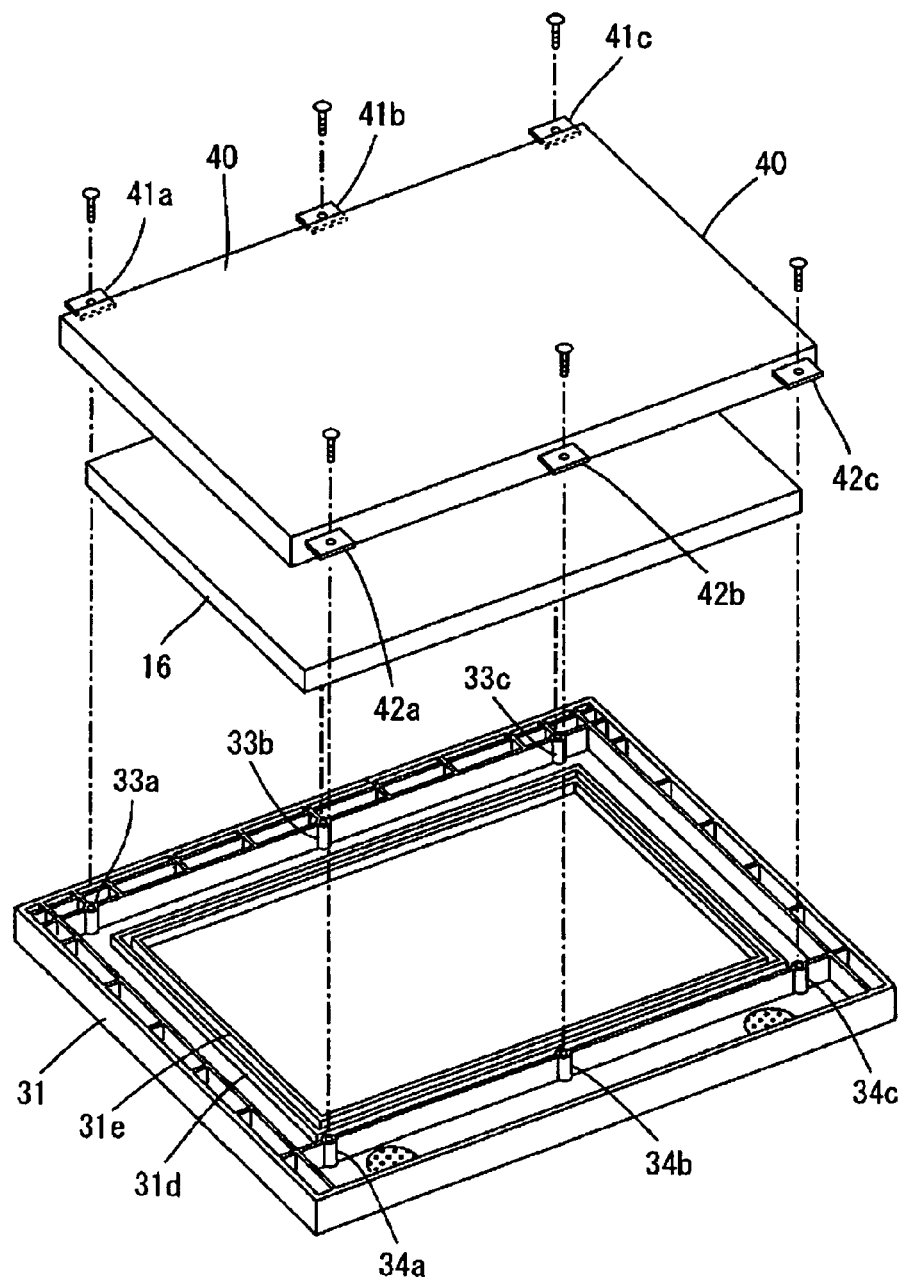
FIG. 6 is an exemplary exploded perspective view showing a front cabinet, a liquid-crystal panel, and a fixture sheet metal.

The structure of the liquid-crystal TV 100 is described hereinafter with reference to FIGS. 2 to 6. FIG. 2 is a perspective view showing the liquid-crystal TV 100 as seen on the skew, FIG. 3 is a sectional view of the liquid-crystal TV 100 shown in FIG. 2, as cut in the vertical as well as the front-to-the back direction substantially at the center in the lateral direction thereof, FIG. 4 is a schematic representation showing a positional relationship among a video display region X, a video non-display region Y, and a metal sheet 60, on a display face of the liquid-crystal panel 16, FIG. 6 is an exploded perspective view showing a manner in which the liquid-crystal panel 16, and a fixture sheet metal 40 are fitted to a front cabinet 31, and FIG. 5 is a schematic representation illustrating spacing between the liquid-crystal panel 16, and ribs 31e, and 31d, respectively.

In FIG. 2, a cabinet 30 of the liquid-crystal TV 100 is formed by joining the front cabinet 31, and a rear cabinet 32, both being made of plastics, with each other. The liquid-crystal panel 16, the fixture sheet metal 40, a substrate on which the respective components electrically making up the liquid-crystal TV 100 are formed, and so forth are housed in the cabinet 30. The front cabinet 31 has an opening substantially rectangular in shape, penetrating through the interior of the cabinet 30, and the video display region X (a view area) where a video can be displayed on the display face of the liquid-crystal panel 16 is exposed from the opening.

The liquid-crystal panel 16 broadly comprises a front glass 62, a video light generation unit 61, and the metal sheet 60. The video light generation unit 61 broadly comprises a liquid-crystal cell, a back light for irradiating a back face of the liquid-crystal cell with light, and a dimming sheet for dimming the light emitted from the back light before irradiating the liquid-crystal cell. The front glass 62 is positioned on a surface of the liquid-crystal panel 16, adjacent to the front face thereof, transmitting video light outgoing from the video light generation unit 61 toward the front surface while being positioned between the video light generation unit 61 and outside. The metal sheet 60 covers a back face, upper and lower side faces, and right and left side faces of the video light generation unit 61 so as to prevent the light of the video light generation unit 61 from leaking from the back face, and the side faces of the video light generation unit 61, respectively.

The liquid-crystal panel 16 displays a video based on the video signal inputted via the driving driver 14, in the video display region X on the front face side thereof, substantially rectangular in shape. Gaps are formed substantially at equal intervals between the display face of the liquid-crystal panel 16, and a rim of an opening 31f of the front cabinet 31. The gap is to provide a spacing for preventing the opening 31f form coming in contact with the liquid-crystal panel 16 and the spacing is of such magnitude as not to allow a viewer to perceive presence of the gap.

The video display region X where a video is displayed, and the video non-display region Y are formed on the display face of the liquid-crystal panel 16. The video display region X is the region substantially rectangular in shape where the light of the back light can pass through the liquid-crystal cell toward the surface side. The video display region X is formed on the display face of the liquid-crystal panel 16 except for edges thereof, on the upper and lower sides as well as the right and left sides. The video non-display region Y is a region shaped like a frame, surrounding the video display region X, and preventing the light of the back light from passing through the liquid-crystal cell toward the surface side thereof. The video non-display region Y is formed on the display face of the liquid-crystal panel 16 in such a way as to be in contact with the edges thereof, on the upper and lower sides as well as the right and left sides.

The metal sheet 60 wraps around the liquid-crystal panel 16 so as to reach front-side edges thereof, on upper and lower sides as well as right and left sides, while covering the back face, and the side faces of the liquid-crystal panel 16, as shown in FIG. 4. Further, the metal sheet 60 covers substantially the entire face of the liquid-crystal panel 16, except the video display region X, however, a frame-like region of the video non-display region Y, adjacent to the video display region X, is slightly left out without being covered by the metal sheet 60. That is, a frame-like region of the video non-display region Y, covered by the metal sheet 60, a frame-like region of the video non-display region Y, not covered by the metal sheet 60, and the video display region substantially rectangular in shape are formed sequentially from the outer periphery of the display face of the liquid-crystal panel 16.

The rim of the opening 31f of the front cabinet 31 is formed in such a shape as to be disposed at a position adjacent to the portion of the video non-display region Y, adjacent to the video display region X. This is required in order to prevent the video non-display region Y from coming into a visual field of the viewer without allowing the front cabinet 31 to cover the video display region X.

The fixture sheet metal 40 is formed substantially in the shape of a cuboid that is thin in the front-to-the back direction, and wide in the vertical as well as the lateral direction, thereby being in the shape of a shallow box-shaped vessel. The fixture sheet metal 40 has inner dimensions substantially matching outer dimensions of the liquid-crystal panel 16, and is capable of housing the liquid-crystal panel 16 so as to be held therein. Further, the fixture sheet metal 40 is provided with fins 41 (upper fins) each protruding from an upper side face thereof, in a substantially perpendicular fin-like manner, and fins 42 (lower fins) each protruding from a lower side face thereof, in the substantially perpendicular fin-like manner. A screw hole is formed in the respective fins 41, and the respective fins 42.

Those fins 41, and fins 42 correspond to screw bosses 33, 34, respectively, and the screw holes formed in the respective fins 41 correspond to respective positions of the screw bosses 33, at the time of fitting the liquid-crystal panel 16 to the front cabinet 31, while the screw holes formed in the respective fins 42 correspond to respective positions of the screw bosses 34, at the time of fitting the liquid-crystal panel 16 to the front cabinet 31.

Then, the fixture sheet metal 40 is disposed such that the video display region X of the liquid-crystal panel 16 is exposed frontward from the opening 31f of the front cabinet 31 while housing the liquid-crystal panel 16 therein, and the fixture sheet metal 40 is secured to the respective screw bosses 33, 34 through the respective screw holes in the fins 41, 42, respectively, thereby securing the fixture sheet metal 40 to the front cabinet 31. That is, the liquid-crystal panel 16 housed in the fixture sheet metal 40 is also secured to the front cabinet 31.

At this point in time, parts of the metal sheet 60, positioned on the display face side of the liquid-crystal panel 16, are butted against the periphery of the opening 31f of the front cabinet 31. Meanwhile, the front glass 62 of the liquid-crystal panel 16 is not in contact with the front cabinet 31, and a gap of a predetermined spacing is formed between the front glass 62 and the periphery of the opening 31f. The gap is of substantially equal spacing at any site on the periphery of the opening 31f. A structure for the gap keeping the substantially equal spacing will be described in detail later.

Portions of the fixture sheet metal 40, at a plurality of spots, respectively, on the back face side thereof, are notched and raised and the respective tips of the portions of the fixture sheet metal 40, notched and raised, are bent so as to be substantially parallel with the liquid-crystal panel 16. The screw hole is formed in each of the plurality of the tips, notched and raised, and various substrates 50 for electrically controlling the liquid-crystal TV 100 are placed on the respective tips to be subsequently secured to the fixture sheet metal 40 by the screws.

A circuit configuration disposed on the substrates 50 secured to the back face of the liquid-crystal panel 16 as described includes the tuner 10, the video signal processor 12, the driving driver 14, the audio signal processor 18, the power supply circuit 24, the microcomputer 22, and so forth. The driving driver 14 may be disposed inside the metal sheet 60, thereby making up a module comprising the driving driver 14 integral with the liquid-crystal panel 16.

Further, the fixture sheet metal need not necessarily be formed in a box-like shape, and it need only be sufficient if the same can secure the liquid-crystal panel 16 to the front cabinet 31. Accordingly, the fixture sheet metal may be made up such that the same is separated between an upper side portion and a lower side portion, and the sheet metal portions separated between the upper side, and lower side of the liquid-crystal panel 16, respectively, are secured to the front cabinet 31, thereby causing the sheet metal to be secured to the front cabinet 31.

The rib 31d (a second rib), and the rib 31e (a first rib) are formed on an inner-face side of the front cabinet 31. The rib 31e is a rib extended backward along the rim of the opening 31f, and the rib 31d is a rib extended backward from a position away from the rim of the opening 31f with a predetermined interval kept therebetween. Those rib 31e, and rib 31d are formed in a shape offsetting each other. That is, as shown in FIG. 5, with respective portions of the rib 31e, and rib 31d, positioned above or below the opening 31f, sites thereof, positioned on a straight line extending in the vertical direction, are equal to each other in height (respective lengths thereof, extended backward from the inner face of the front cabinet 31) and with respective portions of the rib 31e, and rib 31d, positioned on the right side or the left side of the opening 31f, sites thereof, positioned on a straight line extending in the lateral direction, are equal to each other in height (respective lengths thereof, extended backward from the inner face of the front cabinet 31).

The rib 31e is formed along the rim of the opening 31f. Accordingly, when the liquid-crystal panel 16 is secured to the front cabinet 31, the rib 31e is brought to a position corresponding to a region of the video non-display region Y of the liquid-crystal panel 16, not covered by the metal sheet 60. On the other hand, since the rib 31d is formed at an offset position on the outer side of the rib 31e, the same is brought to a position corresponding to a region of the video non-display region Y of the liquid-crystal panel 16, covered by the metal sheet 60.

At this point in time, the rib 31*d* is butted against the metal sheet 60, however, a gap corresponding to a thickness of the metal sheet 60 is formed between the rib 31*e*, and the display face of the liquid-crystal panel 16. That is, as a result of the rib 31*d* being butted against the metal sheet 60, the front cabinet 31 comes to be away in distance from the liquid-crystal panel 16 to the extent of the rib 31*e* and the thickness of the metal sheet 60, and concurrently, the rib 31*e* as well is away in distance from the liquid-crystal panel 16. As a result, the rib 31*e* is held so as to be identical in height to the rib 31*d*, and does not come into contact with the display face of the liquid-crystal panel 16, thereby keeping a predetermined distance therefrom.

The screw bosses 33 are erected backward at predetermined intervals above the opening 31*f* on the inner-face side of the front cabinet 31. Further, the screw bosses 34 are erected backward at predetermined intervals below the opening 31*f* on the inner-face side of the front cabinet 31.

As shown in FIG. 6, the screw bosses 33 are formed substantially at the center (the screw boss 33*b*) in the lateral direction of the front cabinet 31, and in the vicinity of respective ends (the screw bosses 33*a*, 33*c*) of the front cabinet 31, in the lateral direction thereof, and the screw bosses 34 as well are formed substantially at the center (the screw boss 34*b*) in the lateral direction of the front cabinet 31, and in the vicinity of the respective ends (the screw bosses 34*a*, 34*c*) of the front cabinet 31, in the lateral direction thereof. As for the number of the screw bosses comprising the screw bosses 33, 34, it need only be sufficient if there are provided at least three of the screw bosses including the screw bosses 34*a*, 34*c*, formed in the vicinity of the respective ends of the front cabinet 31, and the screw boss 33*b* formed substantially at the center in the lateral direction of the front cabinet 31, and four or more of the screw bosses may be provided.

With the present embodiment, the screw boss 33*a* constitutes a first screw boss, the screw boss 33*b* a second screw boss, and the screw boss 33*c* a third screw boss while the screw boss 34*a* constitutes a fourth screw boss, the screw boss 34*b* a fifth screw boss, and the screw boss 34*c* a sixth screw boss.

With the structure described as above, there is described a procedure on how to fit the liquid-crystal panel 16 to the front cabinet 31 to be secured thereto with reference to FIG. 6.

First, a worker who carries out an assembling work combines the liquid-crystal panel 16 with the fixture sheet metal 40. More specifically, the liquid-crystal panel 16 is covered with the fixture sheet metal 40 from the back-face side of the liquid-crystal panel 16, and the liquid-crystal panel 16 is secured to the fixture sheet metal 40 by the screws through the screw holes formed on the right and left flanks of the fixture sheet metal 40, respectively. By so doing, the liquid-crystal panel 16 is housed in the fixture sheet metal 40 to be secured thereto.

Next, the front cabinet 31 with the inner-face side thereof, facing upward, is placed on a platform. Then, the display face of the liquid-crystal panel 16 is caused to face downward, and the liquid-crystal panel 16 housed in the fixture sheet metal 40 is placed on the front cabinet 31 such that the display face is face to face with the inner-face side of the front cabinet 31. At this point in time, the video display region X on the display face of the liquid-crystal panel 16 is positioned on the inner side of the opening 31*f*. By so doing, the rib 31*d* comes to be butted against the metal sheet 60, and the rib 31*e* comes to be close to the portion of the video non-display region Y, not covered by the metal sheet 60, causing the gap of a predetermined spacing.

Then, positions of the respective screw holes of the fins 41*a*, 41*b*, 41*c* are aligned with positions of the screw bosses 33*a*, 33*b*, 33*c*, respectively, to be secured together by screws, and positions of the respective screw holes of the fins 42*a*, 42*b*, 42*c* are aligned with positions of the screw bosses 34*a*, 34*b*, 34*c*, respectively, to be secured together by screws. By so doing, the fixture sheet metal 40 is secured to the front cabinet 31, thereby securing the liquid-crystal panel 16 to the front cabinet 31.

Figure 7A:
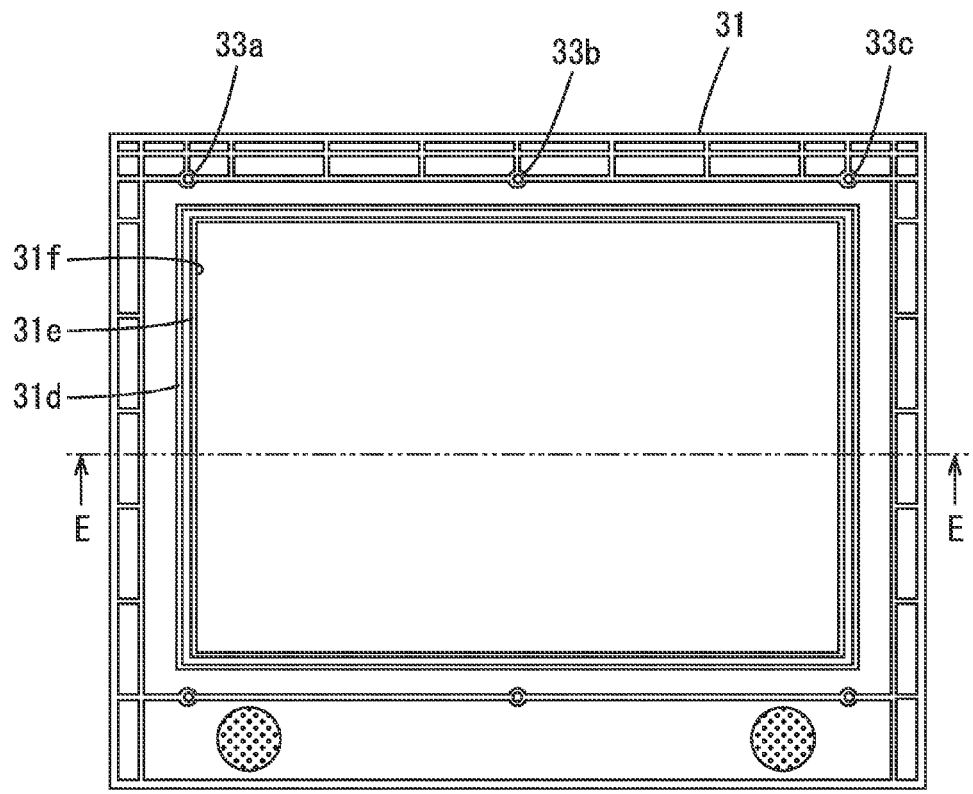
FIG. 7A is an exemplary rear view of the front cabinet.
Figure 11A:
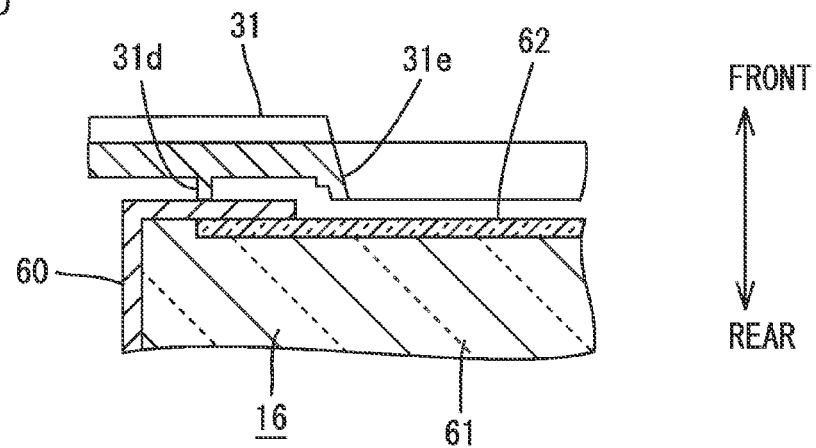
FIG. 11A shows exemplary sectional view along the line A-A in FIG. 10.
Figure 11B:
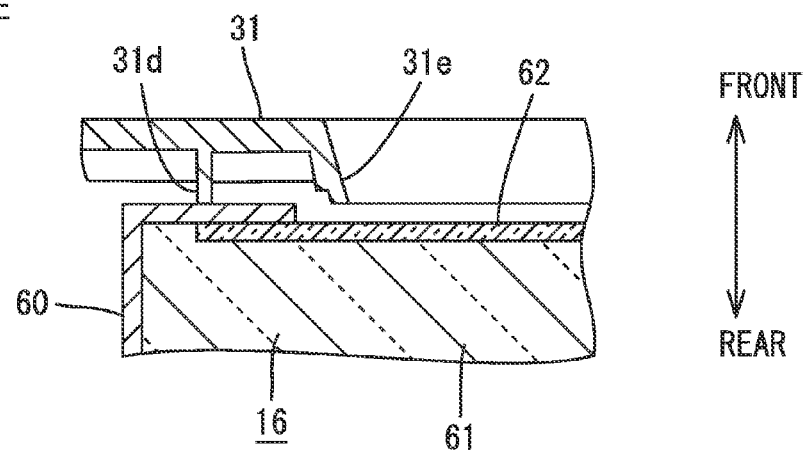
FIG. 11B shows exemplary sectional view along the line B-B in FIG. 10.
Figure 11C:
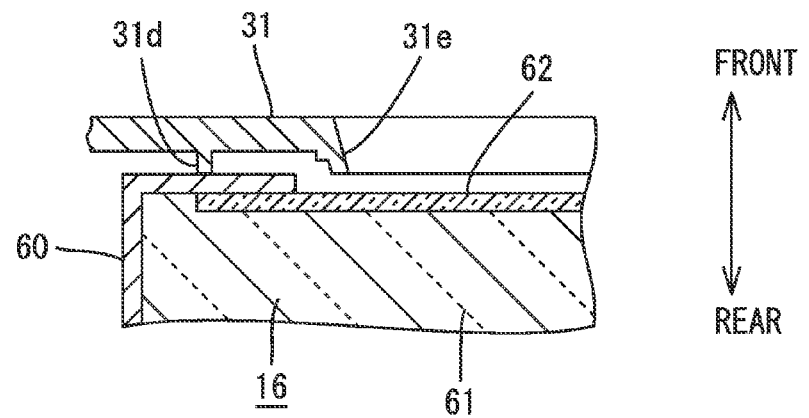
FIG. 11C shows exemplary sectional view along the line C-C in FIG. 10.

C. Display Panel Fitting Structure:

Next, there are described the spacing between the liquid-crystal panel 16, and the ribs 31*e*, 31*d*, respectively, and detailed shapes of the respective ribs 31*e*, 31*d* with reference to FIGS. 7A to 11C. FIG. 7A is a partial rear view of the front cabinet 31. FIG. 7B is a sectional view taken on line E-E of FIG. 7A. FIG. 8 is a sectional view showing the liquid-crystal panel 16, and the front cabinet 31 as cut in a direction in which any of the upper, lower, right, and left parts of the rib 31*d* is erected before secured together by the screws, and FIGS. 9A-9C show sectional views taken on line A-A, B-B, and C-C, in FIG. 8, respectively. FIG. 10 is a sectional view showing the liquid-crystal panel 16, and the front cabinet 31 as cut in the direction in which any of the upper, lower, right, and left parts of the rib 31*d* is erected after secured together by the screws, and FIGS. 11A-11C shows sectional views taken on line D-D, E-E, and F-F, in FIG. 10, respectively.

Figure 7B:
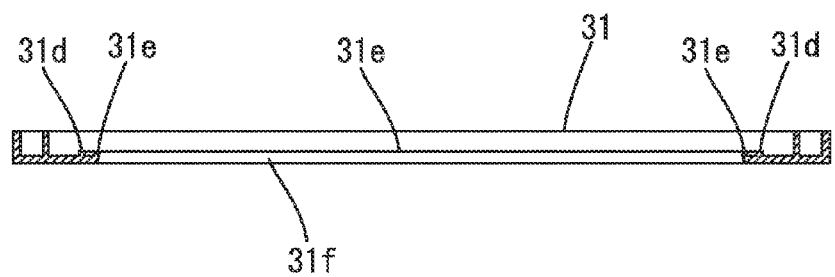
FIG. 7B is an exemplary sectional view taken on line E-E of FIG. 7A.

In the sectional view of FIG. 7B, the rib 31*e* is in a shape gradually approaching toward the rear face side from respective corners on the right and left of the opening 31*f* onto the vicinity of the center of the respective sides of the opening 31*f*. This shape applies to not only a region of the rib 31*e*, positioned on the upper side of the opening 31*f*, but also to regions of the rib 31*e*, positioned on the lower side, right side, and left side of the opening 31*f*, respectively, so that the rib 31*e* is in the shape curving gradually so as to gradually approach toward the rear face side from the respective corners onto the vicinity of the center of the respective sides of the opening 31*f*.

Next, there is described hereinafter a positional relationship between the front cabinet 31, and the liquid-crystal panel 16. As shown in FIG. 8, with the front cabinet 31 and the liquid-crystal panel 16 before secured together by the screws, a region of the rib 31*d*, in the vicinity of the center thereof, is in contact with the metal sheet 60 of the liquid-crystal panel 16. The gap between the rib 31*d*, and the metal sheet 60 becomes wider as the part of the rib 31*d*, approaches the corners of the opening 31*f* from the vicinity of the center thereof. That is, the metal sheet 60 having a flat face is a contact face against the rib 31*d* having a predetermined convex R (curvature).

Figure 9A:
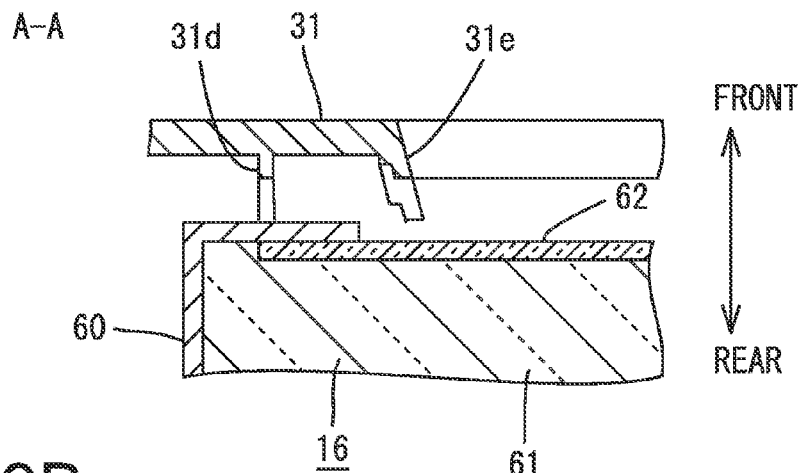
FIG. 9A shows exemplary sectional view along the line D-D in FIG. 8.
Figure 9B:
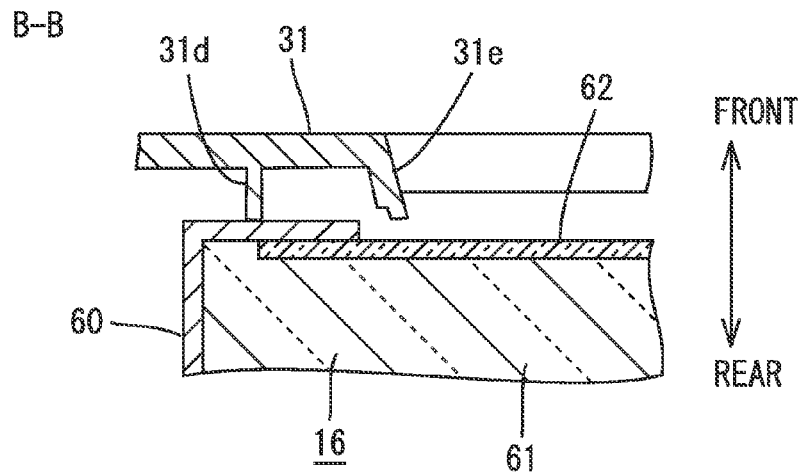
FIG. 9B shows exemplary sectional view along the line E-E in FIG. 8.
Figure 9C:
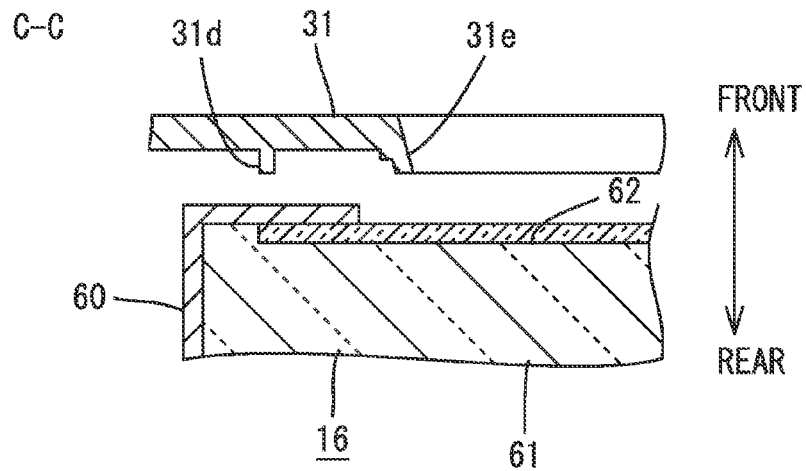
FIG. 9C shows exemplary sectional view along the line F-F in FIG. 8.

In a state where the liquid-crystal panel 16 is placed on the front cabinet 31 in this way, the region of the rib 31*d*, in the vicinity of the center thereof (a section along the line B-B), is in contact with the metal sheet 60 (as shown in FIG. 9B), and the rib 31*e* keeps the gap from the front glass 62, substantially equal to a thickness of the metal sheet 60. Further, as regions of the rib 31*d* come closer to the corners, respectively, (sections along the lines A-A, C-C, respectively), those regions come to float off the metal sheet 60, and the rib 31*e* comes to have a gap from the front glass 62, corresponding to magnitude of floating of the rib 31*d* in addition to the thickness of the metal sheet 60 (as shown in FIGS. 9A and 9C).

In the state where the liquid-crystal panel 16 is placed on the front cabinet 31 in this way, the fin 41*a* is secured to the screw bosses 33*a* by the screw through the screw hole of the fin 41*a*, and the fin 41*c* is secured to the screw bosses 33*c* by the screw through the screw hole of the fin 41*c*, respectively, whereupon the regions of the front cabinet 31, in the vicinity of the respective corners, are drawn in the direction of arrows shown in FIG. 8. At this point in time, the rib 31d is similarly drawn, and the regions of the rib 31d, in the vicinity of the corners, also come into contact with the metal sheet 60, as shown in FIG. 10.

When the front cabinet 31 is drawn toward the liquid-crystal panel 16, as shown in FIG. 10, the front cabinet 31 itself is bent. Accordingly, the rib 31d in whole, ranging from a region in the vicinity of the respective centers of upper and lower sides thereof to the respective corners thereof, comes to be in contact with the metal sheet 60. At this point in time, all regions of the rib 31d, ranging from a region in the vicinity of the center (a section along the line E-E) to the respective regions in the vicinity of the corners, (sections along the lines D-D, F-F, respectively), come to be butted against the metal sheet 60 (as shown in FIGS. 11A-11C). At the same time, a distance between the rib 31e, and the front glass 62 comes to maintain spacing substantially equal to the thickness of the metal sheet 60 in all the regions of the rib 31e, ranging from the region in the vicinity of the respective centers of the upper and lower sides thereof to the regions in the vicinity of the respective corners.

With a display unit such as a television set and so forth, a display panel is generally in the shape of a rectangle longer from side to aside, and shorter in the vertical direction. For this reason, it is difficult to bring upper and lower sides of the display panel, corresponding to longer sides of the opening 31f, into intimate contact with the metal sheet 60 unless the rib 31d has curvature in shape, and the regions at the corners thereof are drawn near. On the other hand, it is easier to cause right and left sides of the display panel, which are shorter sides, to come into intimate contact with the metal sheet 60 as compared with the case of longer sides of the display panel. Accordingly, such curvatures to be formed on the ribs 31d, 31e, respectively, may be formed either only on the upper and lower sides of the opening 31f, or on the right and left sides thereof, as well.

Now, suppose the screw bosses 33a to 33c, and the screw bosses 34a to 34c are formed so as to be identical in height to each other, parts of the front cabinet 31, in the vicinity of the corners, cannot be sufficiently drawn toward the liquid-crystal panel 16, so that the rib 31d will not be in such as state as to be in contact with the metal sheet 60 on the whole, as shown in FIG. 10. Accordingly, the screw bosses 33a to 33c, and the screw bosses 34a to 34c are formed so as to differ in height from each other in consideration of the curvature described.

More specifically, the screw bosses 33a, 33c, 34a, 34c, in the vicinity of the corners of the front cabinet 31, respectively, where the front cabinet 31 is to be drawn toward the liquid-crystal panel 16 for a longer distance, are rendered lower in height by the magnitude of the floating of the rib 31d than the screw bosses 33b, 34b, respectively. That is, the screw bosses 33a to 33c, and the screw bosses 34a to 34c are formed so as to become identical in height to each other with the rib 31d being butted against the metal sheet 60 on the whole. By so doing, it becomes possible to cause the front cabinet 31 to be sufficiently drawn toward the liquid-crystal panel 16.

Needless to say, respective heights of the fins 41a to 41c, and 42a to 42c may be adjusted instead of respective heights of the screw bosses. In the case of coping with the need for drawing the front cabinet 31 to be sufficiently drawn toward the liquid-crystal panel 16 through adjustment of the fins, the fins 41a, fin 41c, 42a, 42c, formed in the vicinity of the front cabinet 31, are rendered longer in distance from the inner-face side of the front cabinet 31 than the fins 41b, 42b, respectively.

D. Summary

In short, on the periphery of the opening 31f, there are formed the rib 31e extending toward the position corresponding to the region of the video non-display region Y of the liquid-crystal panel 16, not covered by the metal sheet 60, and the rib 31d in such a shape as to be offset on the outer side of the rib 31e, extending toward the metal sheet 60, and the rib 31e, and the rib 31d each are at an equal distance from the display face of the liquid-crystal panel 16, each being in the shape gradually approaching toward the rear face from the respective corners of the opening 31f toward the region in the vicinity of the centers of the respective sides thereof. By so doing, it is possible to form a gap of such a predetermined spacing as not to cause a viewer to feel a sense of discomfort while keeping the display panel out of contact with a view area periphery of the cabinet.

To that end, the invention provides in its one aspect a display panel fitting structure for fitting a display panel to a cabinet, comprising the display panel for displaying a video based on a video signal inputted, in a video display region on a front face side thereof, substantially rectangular in shape, and surrounded by a video non-display region shaped like a frame, a metal sheet for covering the video non-display region on the front face of the display panel, except a frame-like region of the video non-display region, adjacent to the video display region, while covering a back face, and side faces of the display panel, a front cabinet having an opening for exposing the video display region on the display panel to the front face thereof, a periphery of the opening being butted against the metal sheet, a rear cabinet to be joined with the front cabinet to thereby house the display panel therein, and a fixture sheet metal for securing the display panel to the front cabinet, wherein a first rib extending toward the frame-like region on the display panel, and a second rib in a shape offset on the outer side of the first rib, extending toward the metal sheet, are formed on an upper side and a lower side of the periphery of the opening, respectively, while the first rib, and the second rib each are at an equal distance from the display face of the liquid-crystal panel, each being in a shape gradually approaching toward the rear face of the display face of the liquid-crystal panel from the respective corners of the opening toward a region in the vicinity of the respective centers of upper and lower sides thereof.

With such a configuration as described, when the display panel is secured to the front cabinet through the intermediary of the fixture sheet metal, the second rib ranging from the region in the vicinity of the respective centers of the upper and lower sides of the opening to the right and left corners thereof comes to be in contact with the metal sheet while the gap of the predetermined spacing occurs between the first rib, and the display panel. The gaps are formed substantially at equal intervals in a range from the region in the vicinity of the respective centers of the upper and lower sides of the opening to the right and left corners thereof. Then, the need for an additional component such as an unwoven cloth, and so forth is eliminated, so that a part count can be reduced.

With the configuration described as above, the first rib and second rib are formed on the upper side and the lower side, respectively, however, needless to say, the first rib and second rib may be formed on the right side, and the left side of the periphery of the opening, as well, respectively. With the adoption of such a configuration as described, it will become possible to cause the gap of the predetermined spacing to occur between the first rib and the display panel not only on the upper and lower sides, but also on the right and left sides as well.

Further, the fixture sheet metal is secured to screw bosses formed at least in the vicinity of the respective corners of the opening of the front panel, and in the vicinity of the respective centers of the upper and lower sides thereof by screws, respectively, and respective heights of the screw bosses may match respective heights of parts of the second rib, corresponding to respective positions where the respective screw bosses are formed.

With the adoption of such a configuration as described, upon the fixture sheet metal being secured to the screw bosses by the screws, the display panel is secured to the front panel, and concurrently, the respective corners of the first rib, and the second rib are drawn toward the display panel. It follows that the second rib in whole comes to be butted against the metal sheet, and the first rib is bent so as to be substantially identical in shape to the send rib, thereby causing the gaps of the predetermined spacing to occur against the display panel. Accordingly, it becomes possible to execute the formation of the gap of the predetermined spacing concurrently with fitting of the display panel to the cabinet through adjustment of the respective heights of the screw bosses, so that the number of work process steps is reduced to thereby enable work efficiency to be enhanced.

Further, as a specific example of a panel type television wherein the display panel fitting structure described as above is adopted, the invention provides in its another aspect a panel type television comprising a tuner for receiving a signal at a desired frequency out of a TV broadcast signal inputted via an antenna and outputting an intermediate frequency signal, a video signal processor for extracting a video signal out of the intermediate frequency signal outputted by the tuner, and generating a panel drive signal corresponding to the video signal to be then outputted to a driving driver, a driving driver for driving a display panel on the basis of a panel drive signal as inputted, thereby displaying a video on a screen, said panel type television further comprising the display panel for displaying a video based on the panel drive signal as inputted, in a video display region on the front face side thereof, substantially rectangular in shape, and surrounded by a video non-display region shaped like a frame, a metal sheet for wrapping around the display panel so as to reach front-side edges thereof, on upper and lower sides as well as right and left sides, while covering a back face, and side faces of the display panel, thereby covering substantially the entire face of the display panel, except the video display region, leaving out a frame-like region of the video non-display region, adjacent to the video display region, so as not to be covered by the metal sheet, a front cabinet having an opening substantially rectangular in shape, and penetrating through the interior of a cabinet, for exposing the video display region on the display panel from the opening, a periphery of the opening being butted against the metal sheet, a rear cabinet joined with the front cabinet to thereby house the display panel therein, a fixture sheet metal substantially in the shape of a cuboid like a shallow box-shaped vessel, thin in the front-to-the back direction, and wide in the vertical as well as the lateral direction, having inner dimensions substantially matching outer dimensions of the display panel, and capable of housing the display panel to be held therein, upper fins each formed in a substantially perpendicular fin-like shape, on an upper side face of the fixture sheet metal, lower fins each formed in a substantially perpendicular fin-like shape, on a lower side face of the fixture sheet metal, a screw hole formed in the upper fin, in the vicinity of the center of the upper side face, and in the respective upper fins, in the vicinity of the respective ends of the upper side face, a screw hole formed in the lower fin, in the vicinity of the center of the lower side face, and in the respective lower fins, in the vicinity of the respective ends of the lower side face, a first screw boss erected backward, positioned at the left end on an inner-face side of the front cabinet, above the opening, a second screw boss erected backward, positioned substantially at the center in the lateral direction of the front cabinet on the inner-face side thereof, above the opening, a third screw boss erected backward, positioned at the right end on the inner-face side of the front cabinet, above the opening, a fourth screw boss erected backward, positioned at the left end on the inner-face side of the front cabinet, below the opening, a fifth screw boss erected backward, positioned substantially at the center in the lateral direction of the front cabinet on the inner-face side thereof, below the opening, a sixth screw boss erected backward, positioned at the right end on the inner-face side of the front cabinet, below the opening, a first rib formed so as to be erected backward along a rim of the opening, being placed to a position corresponding to the region of the video non-display region, not covered by the metal sheet, upon the display panel being secured to the front cabinet, a second rib formed so as to be erected backward at a position offset from the first rib, away from the rim of the opening by a predetermined interval, being placed to a position corresponding to a region of the video non-display region, covered by the metal sheet, wherein the first rib, and the second rib each are in a shape curved so as to gradually approach toward the rear face from the right and left corners of the opening toward a region in the vicinity of the respective centers of upper and lower sides thereof, the first and third screw bosses as well as the fourth and sixth screw bosses are formed so as to be lower in height than the second and fifth screw bosses, respectively, by a difference in height between a region in the vicinity of the respective centers of upper and lower sides of the first and second ribs, and the respective corners thereof, and upon the display panel being joined to the front panel, the second rib ranging from a region in the vicinity of the respective centers of upper and lower sides thereof to the right and left corners thereof is butted against the metal sheet while the first rib is held in a state where a gap of a spacing substantially equal to a thickness of the metal sheet occurs between the first rib ranging from a region in the vicinity of the respective centers of the upper and lower sides thereof to the right and left corners thereof, and the display face of the display panel.

As described in the foregoing, the invention can provide the display panel fitting structure wherein while the display panel is kept out of contact with the view area periphery of the cabinet, a gap of such a predetermined spacing as not to cause a viewer to feel a sense of discomfort can be formed therebetween. Furthermore, a part count can be reduced.

Further, it is possible to cause the gap of the predetermined spacing to occur on all sides around the view area periphery, including the upper, lower, right, and left sides thereof.

Further, it is possible to implement the formation of the gap of the predetermined spacing concurrently with fitting of the display panel to the cabinet through adjustment of the respective heights of the screw bosses, so that the number of work process steps is reduced to thereby enable work efficiency to be enhanced.

Although the invention has been described in considerable detail in language specific to structural features or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art.

It is to be understood that the phraseology and terminology employed herein, as well as the abstract, are for the purpose of description and should not be regarded as limiting.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A panel type television comprising:
a display panel formed in a rectangular shape;
a metal sheet covering an edge of a front face of the display panel;
a front cabinet facing the front face of the display panel with a predetermined clearance to the front face of the display panel;
a rectangular opening formed in the front cabinet exposing a video display region on the front face of the display panel;
one or more screw securing structures formed adjacent to a corner of the opening for coupling the display panel with the front cabinet;
a first rib formed on an inner-face side of the front cabinet and extended backward to the front face of the display panel, the first rib is protruding from a first position of the front cabinet, the first position is located along a rim of the opening, and the farther away from the corners of the opening, the higher the height the first rib is;
a second rib formed on an inner-face side of the front cabinet and extended backward to the metal sheet covering an edge of the front face of the display panel, the second rib is protruding from a second position of the front cabinet, the height of the second rib is the same as the height of the first rib, and the second position is located away from the rim of the opening with a predetermined interval kept therebetween;
a tuner for receiving a signal at a desired frequency out of a TV broadcast signal inputted via an antenna and outputting an intermediate frequency signal;
a video signal processor for extracting a video signal out of the intermediate frequency signal outputted by the tuner, and generating a panel drive signal corresponding to the video signal; and
a driver for driving the display panel on the basis of the panel drive signal in order to display a video on the video display region.

2. A display panel fitting structure comprising:
a display panel formed in a rectangular shape;
a metal sheet covering an edge of a front face of the display panel;
a front cabinet facing the front face of the display panel with a predetermined clearance to the front face of the display panel;
a rectangular opening formed in the front cabinet exposing a video display region on the front face of the display panel;
a first rib formed on an inner-face side of the front cabinet and extended backward to the front face of the display panel, the first rib is protruding from a first position of the front cabinet, and the first portion is located along a rim of the opening, and the farther away from the corners of the opening, the higher the height the first rib is; and
a second rib formed on an inner-face side of the front cabinet and extended backward to the metal sheet covering an edge of the front face of the display panel, the second rib is protruding from a second position of the front cabinet, the height of the second rib is the same as the height of the first rib, and the second position is located away from the rim of the opening with a predetermined interval kept therebetween.

3. A display panel fitting structure as set forth in claim 2, wherein:
the first position and the second position are along upper and lower sides of the opening.

4. A display panel fitting structure as set forth in claim 2, wherein:
the first position and the second position are along all sides of the opening.

5. A display panel fitting structure as set forth in claim 2, wherein:
the display panel fitting structure is comprised of one or more screw securing structures formed adjacent to a corner of the opening for coupling the display panel with the front cabinet;
the farther away from the corner of the opening, the higher height of the first rib and the second rib are.

6. A display panel fitting structure as set forth in claim 2, wherein:
the second rib faces and abuts to a region where the display panel is covered by the metal sheet, and
the first rib that protrudes the same height of the second rib faces to a region where the display panel is not covered by the metal sheet, thus the clearance that corresponds to thickness of the metal sheet covering the edge of the front face of the display panel exists between the front cabinet and the front face of the display panel.

* * * * *